United States Patent [19]

Taguchi et al.

[11] Patent Number: 4,966,540

[45] Date of Patent: Oct. 30, 1990

[54] MOLDING MACHINES USING ROTARY SCREWS

[75] Inventors: Masaru Taguchi; Yasuhiro Kuroki; Yoshiharu Uchida; Saburo Kawano, all of Numazu, Japan

[73] Assignee: Toshiba Kikai Kabushiki Kaisha, Tokyo, Japan

[21] Appl. No.: 376,617

[22] Filed: Jul. 7, 1989

[30] Foreign Application Priority Data

Jul. 11, 1988 [JP] Japan ................. 63-172464

[51] Int. Cl.⁵ ............................................. B29C 47/64
[52] U.S. Cl. ..................... 425/208; 264/349; 366/79; 425/209; 425/522; 425/542
[58] Field of Search ............... 425/207, 208, 209, 200, 425/522, 542; 264/349; 366/79, 80, 81, 82, 83, 84, 85, 86, 87, 88, 89, 90

[56] References Cited

U.S. PATENT DOCUMENTS

| | | | |
|---|---|---|---|
| 1,604,799 | 10/1926 | Barton | 425/208 |
| 3,239,882 | 3/1966 | Yokana | 366/82 |
| 3,664,790 | 5/1972 | Hollander | 425/207 |
| 3,730,492 | 5/1973 | Maddock | 366/82 |
| 3,942,774 | 3/1976 | Sokolow | 366/81 |

FOREIGN PATENT DOCUMENTS

| | | | |
|---|---|---|---|
| 1283496 | 11/1968 | Fed. Rep. of Germany | 425/208 |
| 204440 | 11/1983 | Fed. Rep. of Germany | 366/79 |
| 3723456 | 4/1988 | Fed. Rep. of Germany | 366/79 |
| 1229578 | 9/1960 | France | 264/349 |
| 48-19702 | 6/1973 | Japan | 425/208 |
| 61-272124 | 12/1986 | Japan | 425/207 |

*Primary Examiner*—Jay H. Woo
*Assistant Examiner*—James P. Mackey
*Attorney, Agent, or Firm*—Cushman, Darby & Cushman

[57] ABSTRACT

In a molding machine, the front end of a rotary screw is provided with at least one slot communicated with a metering section so as to make uniform the temperature of plasticized resin in a space in front of the rotary screw.

9 Claims, 7 Drawing Sheets

PROCESSION OF COLOR CHANGE

| TIME ELAPSED AFTER SUPPLYING RAW MATERIAL min. | SCREW OF THIS INVENTION | PRIOR SCREW AND STATIC SCREW | PRIOR SCREW ALONE |
|---|---|---|---|
| | T DIE | T DIE | T DIE |
| 6 min. | | | |
| 9 min. | | | |
| 12 min. | | | |
| 15 min. | PALE BLACK COLOR REMAINS | PALE BLACK COLOR REMAINS | PALE BLACK COLOR REMAINS |
| 18 min. | CAN TAKE OUT PRODUCT | CAN TAKE OUT PRODUCT | |
| 21 min. | | | |
| 24 min. | | | |
| 27 min. | | | CAN TAKE OUT PRODUCT |

FIG. 9

PROCESSION OF COLOR CHANGE

| | SCREW OF THIS INVENTION | SCREW OF LAID OPEN U.M 8070/1976 |
|---|---|---|
| TIME ELAPSED AFTER CHANGING RAW MATERIAL 5 min. | ● | ● |
| 7 min. | ◉ | ◉ |
| 10 min. | ⊙ | ○ |
| 15 min. | ⊙ | ○ |
| 17 min. | ○ COMPLETE | ○ |
| 20 min. | | ○ |
| 25 min. | | ○ COMPLETE |

MOLDING MACHINES USING ROTARY SCREWS

BACKGROUND OF THE INVENTION

This invention relates to a single screw extruder, a blow molding machine, and an injection molding machine each using a rotary screw which has a screw head of special construction capable of preventing overheating and stagnation of resin at the front of the screw. Although the invention is applicable to an extruder, a blow molding machine and an injection molding machine, for the sake of brevity they are all merely termed a molding machine and the invention will be described in connection with an extruder as a typical example.

The front or outer end of the screw of a prior art extruder has a conical configuration and molten resin extruded by the rotation of the screw is pushed out from the peripheral portion of the metering section of the screw, and then spirally flows as a layer flow along the conical surface of the screw to reach the front of the screw.

The resin in contact with the conical surface of the screw is heated due to its viscosity and rotation of the screw. As the viscous heating continues during this spiral flow around the screw tip, the temperature of the resin continuously increases and reaches its maximum at the center of the screw head. Furthermore, since there is no propelling force generated by the rotation of the screw at the central portion, the resin stays in the central portion.

As described above, with a prior art screw the resin is overheated at the conical surface of the screw head and the molten resin stagnates at the central portion, resulting in the following problems.

1. When the extruder is operated continuously for a long interval, the resin which has stagnated for a long time at the conical portion of the screw deteriorates from the local heating and changes color. A portion of the degraded resin flows into the extruded product and forms streaks or fish eyes having different colors, thus degrading the quality of the extruded products.

Figure 1:
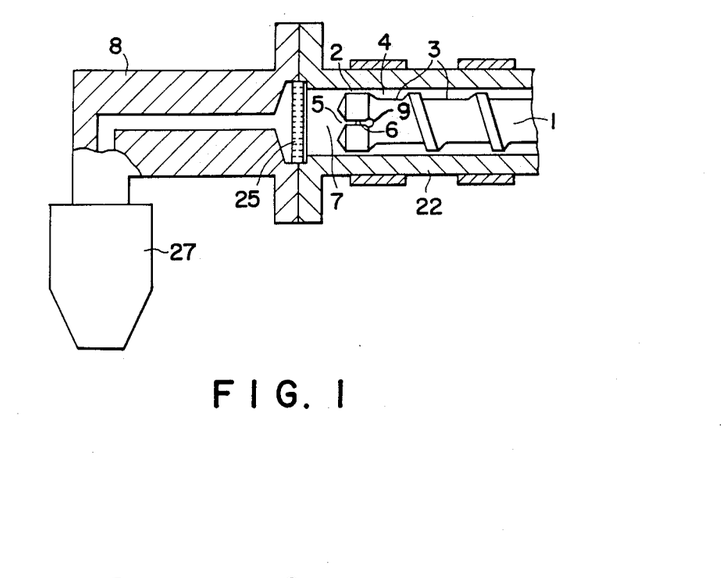
FIG. 1 is a longitudinal sectional view showing important parts of a molding machine embodying the present invention.
Figure 11:
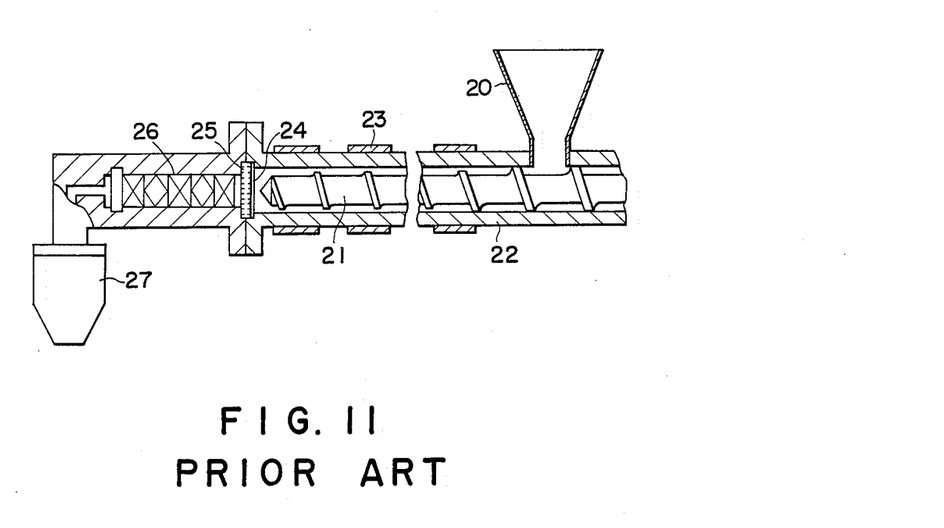
FIG. 11 (Prior Art) is a longitudinal sectional view prior art injection molding machine utilizing a T die.

2. The temperature of the resin is higher at the central portion than at the peripheral portion due to the heating at the conical portion of the screw head and the stagnation of the molten resin at the central portion. This causes unfavorable influence upon the processing of flat film or sheet with a T die or a coat hanger die. More particularly, the resin temperature distribution in the width direction of the die becomes high toward the center position thereof in the T die having a feed opening at the center as shown in FIGS. 1 and 11 (Prior Art). Due to the difference in the molten resin viscosity caused by such nonuniform temperature distribution of the molten resin, the thickness of the extruded sheet varies in the width direction of the die. Correcting this condition for producing a sheet with uniform thickness is a timely affair.

3. It takes a certain time purge the stagnated resin at the front of the screw when changing the color of the resin so that changing colors take a long time.

For this reason, as shown in FIG. 11 (Prior Art), according to prior art apparatus, a static mixer 26 is provided on the downstream side of the extruder for enhancing the admixing of the molten resin in the radial direction so as to disperse the molten resin flow and to make the resin temperature uniform in the radial direction.

The prior art extruder shown in FIG. 11 (Prior Art) will now be described for the sake of better understanding the instant invention. The extruder shown in FIG. 11 (Prior Art), comprises a hopper 20 for supplying resin raw material and an extruder screw 21 having a screw tip and a cone angle of about 120°. By rotating the screw 21, the resin raw material supplied from hopper 20 is plasticized and conveyed to the downstream side of the extruder, which is toward the left in FIG. 11. The extruder further comprises a heating cylinder 22 containing the screw 21 and provided with an electric heater 23 on the outer periphery. A screen pack 24 and a breaker plate 25 at the front end of the heating cylinder 22 for preventing foreign particles in the molten resin from flowing to the downstream side. A static mixer 26 is provided on the downstream side of the breaker plate 25 for radially dispersing and mixing the resin flow extruded from the front of the screw, thus making the resin temperature uniform.

One proposed solution to A T die 27 is provided for molding the molten resin in a desired configuration the problems described above is to improve the construction of the front of the screw as disclosed in FIGS. 3–5 of Japanese laid open utility model specification No. 8070/1976. Therein, a torpedo shaped member for breaking a resin flow is connected to the front of the screw with a suitable gap between the torpedo shaped member and the inner surface of a heating cylinder. One or more flow paths are formed on the peripheral surface of the torpedo shaped member such that the flow paths are communicated with a single flow passage passing through the center of the torpedo shaped member and opening to the outer end thereof. With this construction, the molten resin flows into a space between the screw and a breaker plate located in the heating cylinder in front of the torpedo shaped member through a gap between it and the heating cylinder. At the same time, the molten resin having the same thermal hysteresis continuously flows out from a central opening of the torpedo shaped member so as to draw surrounding molten resin, thus preventing stagnation of the molten resin.

Where a static mixer is provided for a prior art molding machine as shown in FIG. 11, (Prior Art) the temperature of the molten resin at the front portion of the screw can be made uniform but this is not true for deteriorated resin stagnating at the front end of the screw. Furthermore, resin color can not be changed satisfactory.

In the Japanese specification described above, the resin is also pushed out from the central opening of the screw such that the resin stagnates at the central portion in front of the screw. The resin pushed out from the periphery of the screw and the resin pushed out from the central portion of the screw do not sufficiently, admix which was confirmed by the comparison test (example 4 and FIG. 10 to be described later) regarding color change time and admixing property.

Additionally, the frictional heating of the resin caused by the rotation of the conical surface of the screw can not be eliminated since the resin flows helically along the conical surface of the screw.

SUMMARY OF THE INVENTION

It is an object of this invention to provide a molding machine including a novel rotary screw capable of limiting, heating of the resin at the front of the screw, which can make the resin temperature uniform by preventing the stagnation of resin at the front end of the screw, and which can improve admixing of the resin.

According to this invention there is provided a molding machine comprising a heating cylinder, hopper means provided at one end of the heating cylinder for supplying a plastic resin into the heating cylinder, a rotary screw contained in the heating cylinder for plasticizing the plastic resin, a metering section provided for a portion of the rotary screw on a side opposite the hopper means, the inner surface of the heating cylinder and the front end of the rotary screw defining a throttle member therebetween, characterized in that the front end of the rotary screw is provided with at least one slot communicated with the metering section and the throttle member whereby plasticized resins passing through the throttle member and the slot are mixed together in front of the rotary screw.

The screw may take various configurations. Thus, it may comprise a single slot diametrically extending across the end surface of the rotary screw, or two or more parallel slots, or a triangular or grid-shaped configuration.

DESCRIPTION OF THE PREFERRED EMBODIMENTS

Preferred embodiments of this invention will now be described with reference to FIGS. 1 to 10 in which parts corresponding to those shown in FIG. 11 (Prior Art) are designated by the same reference numerals.

As shown in FIG. 11 (Prior Art) about the head of a rotary screw 1 is provided with a throttle member 2 which throttles or squeezes a resin flow together with the inner surface of the heating cylinder 22. A front portion 3 of the screw 1 constitutes a metering section for determining the extruding capability in accordance with the outer diameter of the screw, the diameter of the reduced diameter portion thereof, and the number of revolutions of the screw. Although the metering section has a definite axial length, a portion of the screw usually constitutes the metering section. The space between the threads of the screw is called a second chamber 4. According to this invention, the outer end or head of the screw is formed with a V-shaped groove 5 and an inclined passage 9 is provided for the inner portion of the groove 5 to communicate with the metering section 3. A first chamber 7 is defined by a breaker plate 25 on the downstream side of the cylinder and the inner surface of the heating cylinder 22.

As the screw is rotated, the resin in the metering section 3 flows through two passages, one through the throttle member 2 and the other through inclined passage 9 and slot 6. These two flows of resin are admixed in the first chamber 7. An adapter 8 connected, to the outer (lefthand) end of the heating cylinder 22 substitutes for the static mixer 26 shown in FIG. 11 (Prior Art). The other end of the adapter 8 is connected to the T die 27.

Figure 2A:
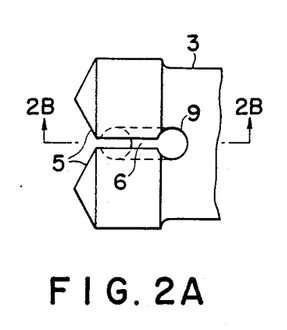
FIG. 2A is an enlarged side view showing a screw head.
Figure 2B:
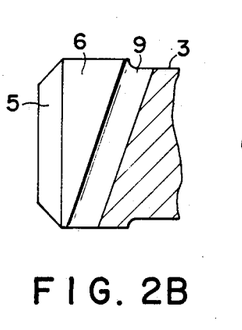
FIG. 2B is a sectional view taken along a line 2B—2B shown in FIG. 2A.
Figure 2C:
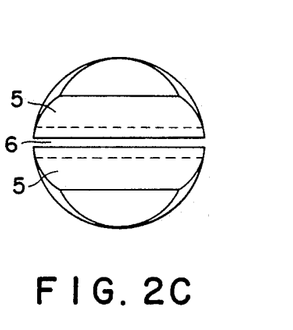
FIG. 2C is an end view of the screw head shown in FIG. 2A.

As shown in FIGS. 2A, 2B and 2C, an inclined passage 9 is formed through the outer end of the screw with the upper end communicating with the metering section 3. As shown in FIGS. 2A and 2C, the V-shaped groove 5 is formed across the surface of the front of the screw, and the bottom end of slot 6 is communicated with the inclined passage 9.

Figure 3A:
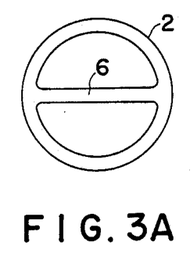
FIGS. 3A~3F and FIGS. 4A and 4B are end views of the screw showing slots of various forms according to this invention.
Figure 3B:
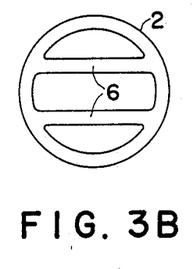
Figure 3C:
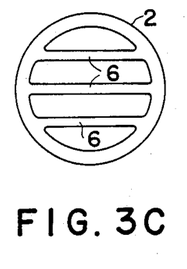
Figure 3D:
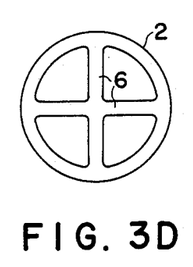
Figure 3E:
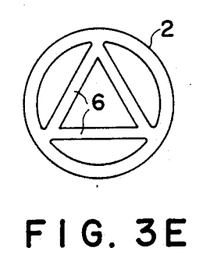
Figure 3F:
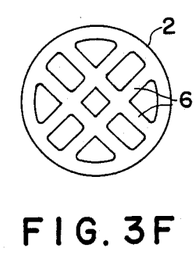

FIGS. 3A through 3F are views of the front end of the screw showing alternative configurations of the grooves 6. In FIGS. 3A, 3B and 3C, the slots are provided across the front of the screw. In FIG. 3A, a single groove 6 extends in the diametric direction of the screw head, while in FIGS. 3B and 3C, two and three grooves are provided in parallel, respectively. In FIG. 3D, the groove 6 has a criss-cross configuration and in FIG. 3E, a triangular configuration. In FIG. 3F, the slot 6 has a grid shaped configuration. As can be noted from FIGS. 3A through 3F, a resin flow extruded through annular throttle member 2 is mixed together with resin flows extruded from slots 6, thereby decreasing the temperature difference of the resultant resin mixture.

Figure 4A:
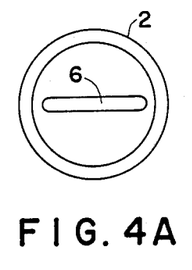
Figure 4B:
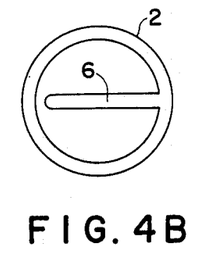

The configuration of the slot 6 is not limited to those shown in FIGS. 3A through 3F. Alternatively, as seen in FIGS. 4A and 4B, both ends or one end of the horizontal slot 6 may be disconnected from the annular resin flow extruded through the throttle member 2.

Figure 5:
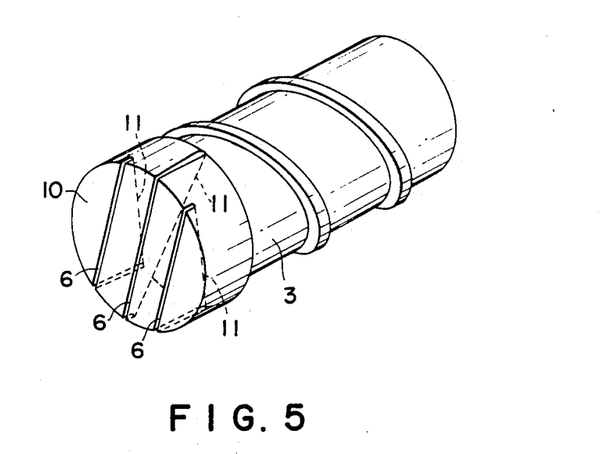
FIG. 5 is a perspective view showing a modified screw head.

In a modification shown in FIG. 5, the front of the screw is cylindrical and has a flat end surface 10 instead of a conical surface. In FIG. 5, the metering section is designated by 3, the slots are designated by 6 and the inclined surfaces of the inner ends of the slots 6 are shown by dotted lines 11 which act as the inclined passages.

Three slots 6 are disposed on the end surface 10 to divide it into three sections having substantially the same area, and the inner ends of these slots communicate with the metering section 3. With this construction, a mixing efficiency of the extruded resin becomes higher than the embodiment shown in FIGS. 2A, 2B and 2C, in which a single slot is provided.

The advantages of various embodiments of this invention will be demonstrated with the following experiments. Experiment 1

In this experiment, the resin temperature distribution in the width direction of an exit opening of a T die shown in FIG. 1 was used. Comparison tests were carried out for the screw of this invention and for a prior art screw shown in FIG. 11 (Prior Art).

Figure 6:
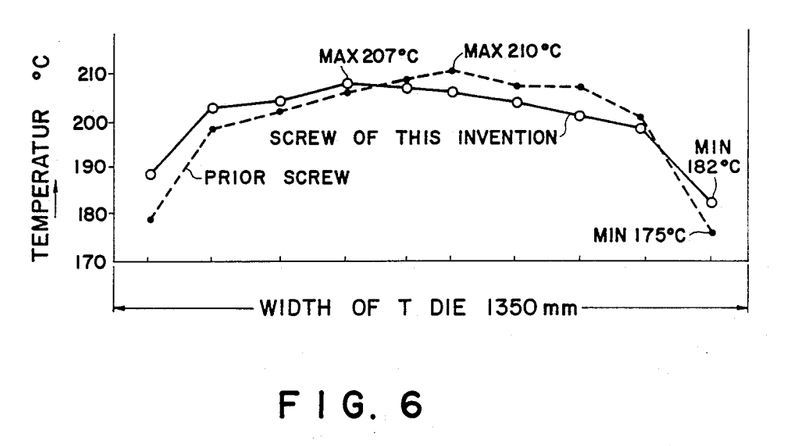
FIG. 6 is a graph showing the resin temperature distribution in the direction of width of a T die discharge opening, and showing the result of experiment 1.

The test specification of this experiment is shown in the following Table 1, while the result of experiment is shown in FIG. 6.

TABLE 1

| | |
|---|---|
| Apparatus used in experiment | SE-90D single spindle type, made by Toshiba Kikai Co. screw diameter: 90 mm length to diameter ratio L/D: 32 T die: lip effective width: 1350 mm gap: 1.2 mm resin temperature measuring instrument used at exit port of T die: thermister made by Anritsu Denki Co. |
| Raw material | Preblended olefin plastic elastomer made by Mitsui Sekiyu Kagaku Co. 8030B elastomer blended with carbon black concentration: 30% master batch 15% and crushed particle 10% |
| Operating condition | set temperature: cylinder 160~190° C. adapter 200° C. T die 200° C. number of revolutions of screw: 50 rpm extruded quantity: 160 kg/hour |

The resin temperature distribution at the exit port of the T die is shown in FIG. 6. With the screw of this invention, the maximum temperature of the resin was 207° C. and the minimum temperature was 182° C. showing a temperature difference of 25° C. With the prior art screw, however, the maximum temperature was 210° C. and the minimum temperature was 175° C. showing a temperature difference of 35° C.

Thus, when the screw of this invention is used, the temperature distribution can be improved by 10° C. in the width direction of the T die. Experiment 2

Similarly to experiment 1, the resin temperature distribution in the width direction of a T die was measured. In the prior art apparatus shown in FIG. 11 (Prior Art) a static mixer was used. Comparative tests were made by using a prior art screw shown in FIG. 11 (Prior Art) and a screw of this invention shown in FIG. 2.

Figure 7:
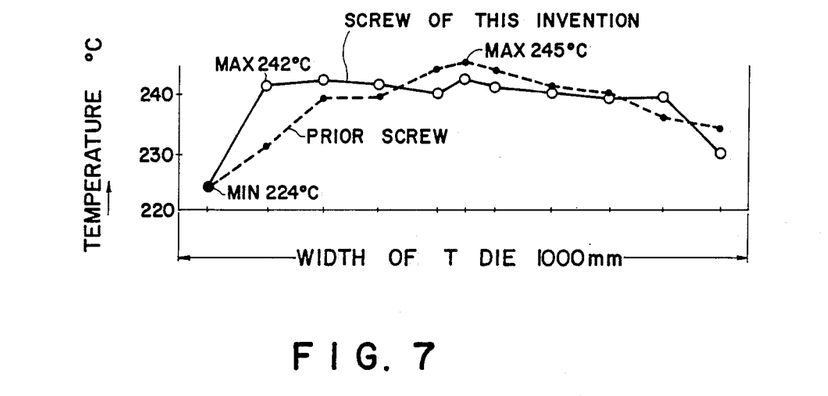
FIGS. 7 and 8 are graphs similar to that shown in FIG. 6 showing the result of experiment 2.
Figure 8:
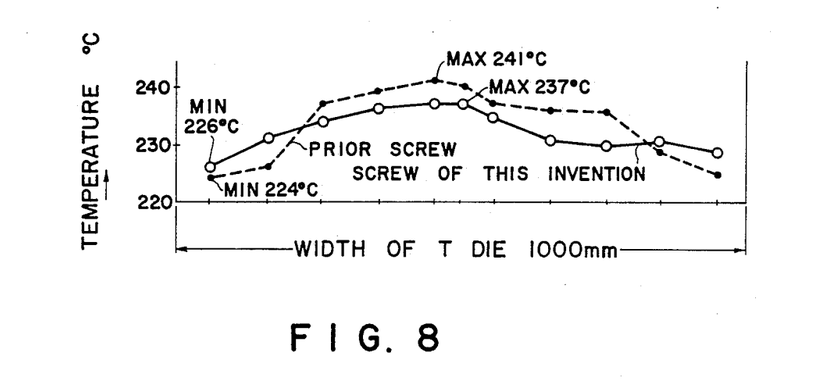

The test specification of this invention is shown in Table 2, while the results of experiment are shown in FIGS. 7 and 8.

TABLE 2

| | | |
|---|---|---|
| Apparatus used in experiment | SE-90D single spindle type, made by Toshiba Kikai Co. screw diameter: 90 mm, L/D = 32 | |
| | (1) | Combination of prior art screw and static mixer manufactured by Kenics Co. (2B × 6 elements) |
| | (2) | Combination of screw of this invention and adapter effective lip width of T die: 1060 mm, gap 1.2 mm resin temperature measuring instrument at exit port of T die: thermister made by Anritsu Denki Co. |
| Raw material | (1) | PP,FS2011D, MFR = 2.5 manufactured by Sumitomo Kagaku Co. |
| | (2) | PP,F1 811 MFR = 2.5 manufactured by Chisso Sekiyu Kagaku Co. |
| Operating condition | set temperature: cylinder 210~240° C. adapter 230° C. T die 230° C. number of revolutions of screw: 160 rpm extruded quantity: 240 kg/hour | |

The difference between FIGS. 7 and 8 lies in the different raw materials and their fields of use. FIG. 7 shows the difference between the maximum and minimum temperatures of a resin PP,FS 2011 manufactured by Sumitomo Kagaku Co. which is used to form a two-axis elongation film. FIG. 8 shows the difference between the maximum and minimum temperatures of a resin PP,XF 1811 manufactured by Chisso Sekiyu Kagaku Co. which is used for preparing food trays.

As can be noted from FIG. 7, where the screw of this invention is used, the difference between the maximum and minimum temperatures is 242−224=18° C. When combination of a conventional screw and a static mixer is used, the difference between the maximum and minimum temperatures is 245−224=21° C. This means that the screw of this invention is superior to the prior art screw. The difference of only 3° C.=21° C.−18° C. is small but effective in realizing excellent dispersion and uniform temperature distribution of the resin.

FIG. 8 shows that where the screw of this invention is used, the difference between the maximum and minimum temperatures of the resin is 237° C.−226° C.=11° C., whereas when a combination of a prior art screw and a static mixer is used, the difference between the maximum and minimum temperatures of the resin is 241° C.−224° C.=17° C. This also shows the superiority of the screw of this invention. Experiment 3

In this experiment, the following three comparison tests were made regarding color change properties.

3-1 A combination of a screw of this invention, an adapter and a T die.

3-2 A combination of a prior art screw, a static mixer and a T die.

3-3 A combination of a prior art screw, an adapter and a T die.

A blended resin consisting of PP,X1811, and 5 parts of a master batch S-3307 (black color) was extruded through the T die for 15 minutes and then PP,XF 1811 natural resin (pale white) was extruded while observing the state of color change at intervals of 3 minutes.

Figure 9:
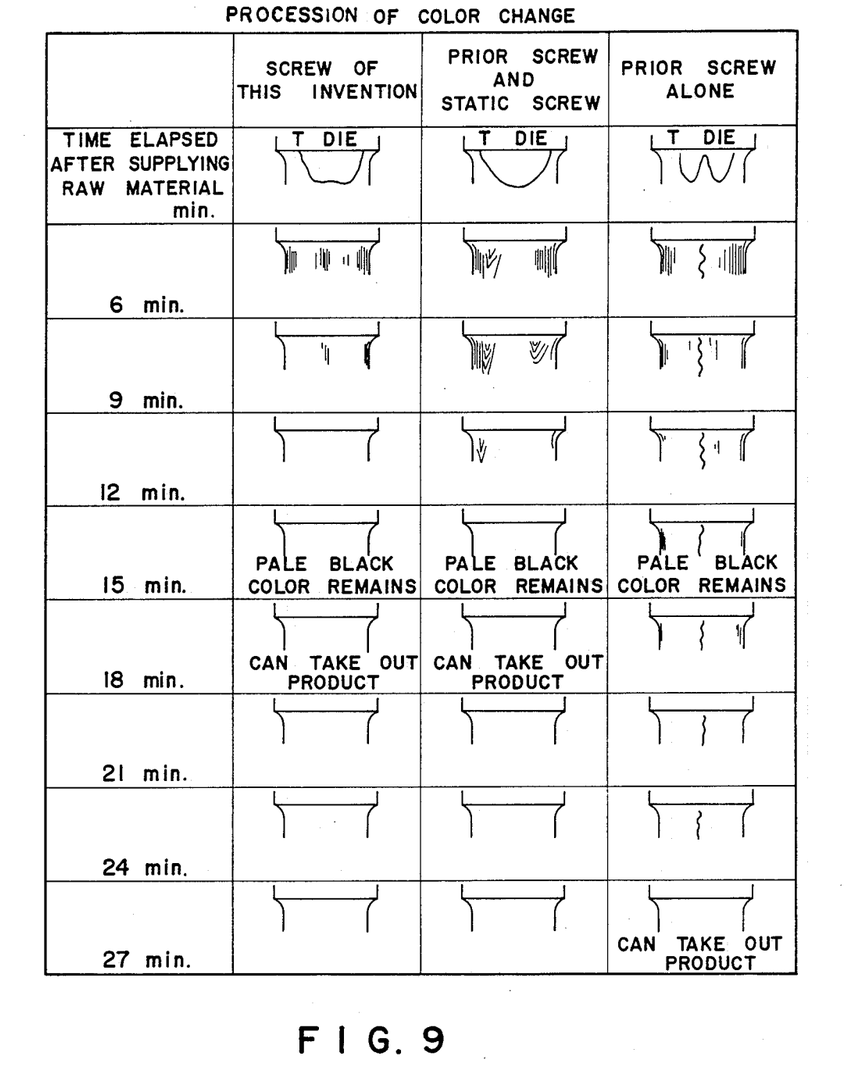
FIG. 9 is a table showing the procedures of color change according to experiment 3.

The test specification of experiment 3 is shown in the following table 3 and the results of the experiment are shown in FIG. 9.

TABLE 3

| | |
|---|---|
| Apparatus used in experiment | SE-90D single spindle type, made by Toshiba Kikai Co. screw diameter: 90 mm, L/D: 32 T die: effective width of lip: 1000 mm gap: 1.2 mm Static mixer: Kennics Co. 2B × 6 elements |
| Raw material | Polypropylene XF 1811, MFR = 2.5, natural, manufactured by Chisso Sekiyu Kagaku Co. master batch: 5 parts of color-S-3307 (black color) manufactured by Sumitomo Kagaku Co. |
| Operating condition | set temperature: cylinder 210~240° C. adapter 230° C. T die 230° C. number of revolutions of screw: 50 rpm extruded quantity: 80 kg/hour |

As FIG. 9 clearly shows, where a screw of this invention is used, color change completes after 18 minutes in the same manner as in a case wherein a combination of a prior art screw, a static mixer and a T die is used. This means that with the screw of this invention, use of a static mixer which was necessary for the prior art mixer becomes unnecessary thereby implying the mechanism. Further, as shown in the righthand column of FIG. 9, an elapsed time 27 minutes is necessary for effecting the color change where a combination of a prior art screw, an adapter and a T die is used. Thus, with the screw of this invention, the color change time can be reduced by 9 minutes. Experiment 4

In this experiment, the screw disclosed in Japanese laid open utility model specification No. 8070/1976 and the screw of this invention were used, and the color change time and the mixing property of the resin were compared at a ferrule near the exit port of an extruder.

The procedure of test is substantially the same as that of experiment 3.

A blended resin consisting of PP,XF 1811, and a master batch S-3307 (black color, two parts) was first extruded through the ferrule for 30 minutes followed by the extrusion of PP,XF 1811 natural (pale white), resin. The color change time at the ferrule was measured at an interval of one minute and the cross-section of the extruded resin was observed.

Resin solidified after extrusion was sliced to a thickness of 0.1 mm and its surface was photographed with a microscope having a magnifying power of 50.

Figure 10:
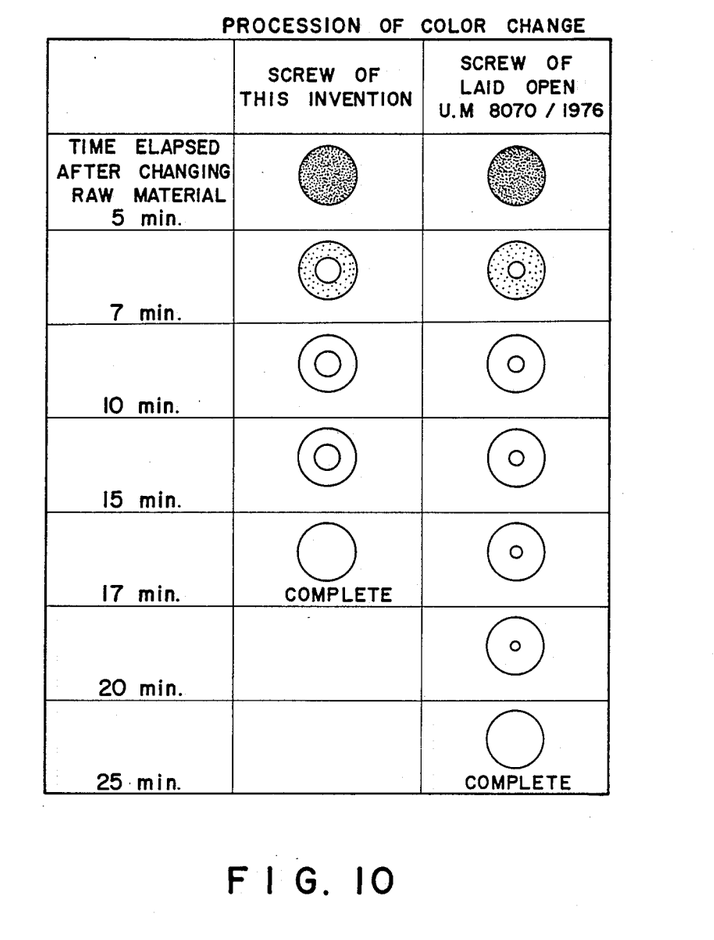
FIG. 10 is a table showing the procedures of color change according to experiment 4.

The test specification of experiment 4 is shown in the following table 4 and the results of the experiment regarding color change time and mixing property are shown in FIG. 10.

FIG. 10 shows that when the screw of this invention is used, the color change time can be reduced by 8 minutes as opposed to a case when a prior art screw disclosed in Japanese laid open utility model specification No. 8070/1976 is used.

When the screw of this invention is used, the resin mixing property is greatly improved, whereas when the prior art screw disclosed in the laid open utility model specification just mentioned is used, the color mixing property is poor resulting in the formation of a stripe shaped pattern.

TABLE 4

| | |
|---|---|
| Apparatus used in experiment | SE-90D single spindle type, made by Toshiba Kikai Co. screw diameter: 90 mm, L/D = 32 ferrule diameter: 30 mm |
| Raw material | Polypropylene XF 1811, MFR = 2.5, natural, manufactured by Chisso Sekiyu Kagaku Co. master batch color-S-3307 (black color, two parts) manufactured by Sumitomo Kagaku Co. |
| Operating condition | set temperature: cylinder 210~240° C. adapter 230° C. ferrule 230° C. number of revolutions of screw: 50 rpm, 160 rpm extruded quantity: 90 kg/hour, 240 kg/hour |
| Remark | The color change time shown in FIG. 10 was measured at the number of revolutions of screw of 50 rpm. |

The four experiments described above show that the screw of this invention improves the color change property and the mixing property.

In other words, the molding apparatus of this invention improves not only the admixing of the resin at the front end of a screw but also prevents stagnation of the resin in front of the screw. Thus, the resin temperature can be made uniform and the time required for a color change can be reduced.

We claim:

1. A molding machine comprising:
    a heating cylinder;
    a hopper cylinder for supplying a plastic resin into said heating cylinder;
    a rotary screw contained in said heating cylinder for plasticizing said plastic resin;
    a metering section provided for a portion of said rotary screw downstream from said hopper cylinder;
    an inner surface of said heating cylinder and a front end of said rotary screw defining a throttle member therebetween, and
    the rotary screw being provided with at least one inclined passage communicated with said metering section and said throttle member, and at least one slot extending from the front end of the rotary screw communicating with said inclined passage; whereby plasticized resins passing through said throttle member and said slot are mixed together in a space in front of the front end of said rotary screw.

2. The molding machine according to claim 1 wherein two or more slots are formed in parallel.

3. The molding machine according to claim 1 wherein said slot has a configuration of a criss-cross.

4. The molding machine according to claim 1 wherein said slot has a configuration of a triangle.

5. The molding machine according to claim 1 wherein said slot has a configuration of a grid.

6. The molding machine according to claim 1 wherein said slot extends diametrically across the end surface of said rotary screw, and one end of said slot is isolated from said throttle member.

7. The molding machine according to claim 1 wherein said molding machine comprises an extruding molding machine, a blow molding machine or an injection molding machine.

8. The molding machine according to claim 1 wherein the front end of said rotary screw has a cylindrical configuration with a flat surface, and the flat surface is divided by a plurality of parallel grooves each communicated with said metering section, divided sections of said flat surface having substantially the same area.

9. The molding machine according to claim 1 wherein the front end of said rotary screw has a V-shaped groove and said slot communicates with a bottom of said V-shaped groove.

* * * * *